US011925220B2

(12) United States Patent
Graham

(10) Patent No.: US 11,925,220 B2
(45) Date of Patent: Mar. 12, 2024

(54) ADJUSTABLE HEADGEAR CONFIGURED TO RECEIVE REMOVABLE LIGHT APPARATUS AND METHODS OF MAKING

(71) Applicant: Raquel Graham, Chicago, IL (US)

(72) Inventor: Raquel Graham, Chicago, IL (US)

( * ) Notice: Subject to any disclaimer, the term of this patent is extended or adjusted under 35 U.S.C. 154(b) by 188 days.

(21) Appl. No.: 17/515,406

(22) Filed: Oct. 30, 2021

(65) Prior Publication Data

US 2023/0020635 A1 Jan. 19, 2023

Related U.S. Application Data

(60) Provisional application No. 63/222,958, filed on Jul. 17, 2021.

(51) Int. Cl.

*A41D 13/01* (2006.01)
*A41D 20/00* (2006.01)
*F21V 21/084* (2006.01)

(52) U.S. Cl.

CPC ............ *A41D 13/01* (2013.01); *A41D 20/00* (2013.01); *F21V 21/084* (2013.01)

(58) Field of Classification Search

CPC ...... A41D 13/01; A41D 20/00; A41D 27/205; F21V 21/084

See application file for complete search history.

(56) References Cited

U.S. PATENT DOCUMENTS

| | | | | |
|---|---|---|---|---|
| 6,733,150 B1 * | 5/2004 | Hanley | ............... | F21V 21/0885 2/209.13 |
| 8,813,268 B1 * | 8/2014 | Fitzgerald | ............. | A42B 3/044 2/422 |
| 2014/0311512 A1 * | 10/2014 | Owoc | .................... | A41D 20/00 132/200 |
| 2018/0008150 A1 * | 1/2018 | Hsieh | ..................... | A41D 1/002 |
| 2018/0102518 A1 * | 4/2018 | Thiel | ...................... | A45C 3/001 |
| 2020/0037685 A1 * | 2/2020 | Graham | ................. | A41D 1/002 |

* cited by examiner

*Primary Examiner* — Thomas M Sember
(74) *Attorney, Agent, or Firm* — TILLMAN WRIGHT, PLLC; Chad D. Tillman

(57) ABSTRACT

Headgear includes a body having an interior fabric panel defining an inwardly facing interior surface and an exterior fabric panel defining an outwardly facing exterior surface. Opposite ends of the exterior fabric panel are located in a rear region of the headgear and opposite ends of the interior fabric panel overlapping to an extent are located in a front region of the headgear. The interior and exterior panels are secured together such that the body surrounds a head-receiving area and is configured for donning on a person's head. A grommet is attached to the body and defines an opening extending through the exterior fabric panel into a space located between the exterior fabric panel and the interior fabric panel. The overlapping ends of the interior fabric panel define a passage accommodating the passing of a light apparatus therethrough for frictional fit in the grommet. Preferably, the body defines a headband.

13 Claims, 1 Drawing Sheet

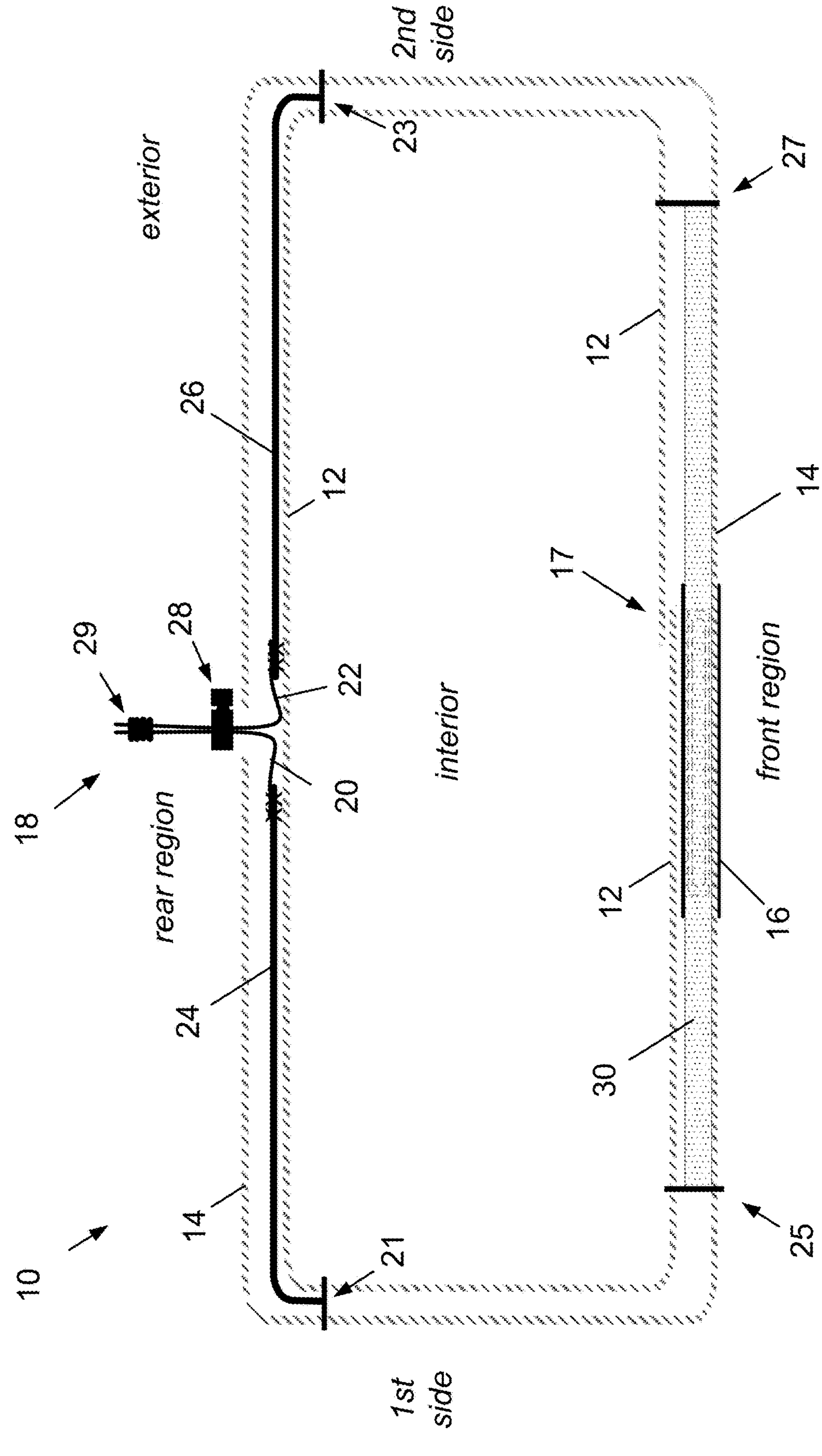
2nd side
exterior
23
27
12
26
12
14
17
29
28
22
interior
front region
18
rear region
20
12
16
24
30
14
10
21
25
1st side

ADJUSTABLE HEADGEAR CONFIGURED TO RECEIVE REMOVABLE LIGHT APPARATUS AND METHODS OF MAKING

CROSS-REFERENCE TO RELATED APPLICATION

This application claims priority under 35 U.S.C. 119(e) to provisional U.S. patent application 63/222,958 filed Jul. 17, 2021, which is incorporated herein by reference.

COPYRIGHT STATEMENT

Any new and original work of authorship in this document is subject to copyright protection under the copyright laws of the United States and other countries. Reproduction by anyone of this document as it appears in official governmental records is permitted, but otherwise all other copyright rights whatsoever are reserved.

BACKGROUND OF THE INVENTION

The invention generally relates to headgear having a light apparatus and methods of making such headgear, and preferably, to headbands having grommets for receiving and retaining removable light apparatus that preferably are rechargeable through USB connections. Exemplary headgear in this regard are disclosed, for example, in U.S. patent application Ser. No. 16/532,452 and in U.S. patent application publication 2020/0037685 A1, the disclosures of which are hereby incorporated herein by reference. Within this context, the headgear of the present invention is intended to utilize the same light apparatus of these two incorporated disclosures, the differences in the headgear of the present invention over the headgear of these two incorporated disclosures being in structural improvements to the design of the headgear that is unrelated to the structure of the light apparatus. Because the light apparatus is fully described in these incorporated disclosures, the following description focuses on such structural improvements to the design of the headgear.

SUMMARY OF THE INVENTION

The invention includes many aspects and features.

In a first aspect, headgear comprises: (a) a fabric body comprising an interior fabric panel defining an inwardly facing interior surface and an exterior fabric panel defining an outwardly facing exterior surface, with opposite ends of the exterior fabric panel being located in a rear region of the headgear and opposite ends of the interior fabric panel overlapping to an extent and being located in a front region of the headgear, the interior and exterior panels being secured together such that the body surrounds a head-receiving area and is configured for donning on a person's head; and (b) a grommet attached to the body and defining an opening extending through the exterior fabric panel into a space located between the exterior fabric panel and the interior fabric panel. The overlapping ends of the interior fabric panel are open and are configured to accommodate the passing of a light apparatus into the space located between the exterior fabric panel and the interior fabric panel. The grommet accommodates the passing of a portion of the light apparatus therethrough for frictional fit therewith such that the light apparatus is retained in place by the frictional fit with the grommet and light is projected by the light apparatus outwardly from the grommet when the light apparatus is turned on.

In a feature, the body defines a headband.

In a feature, the headgear further comprises a drawstring assembly configured to adjust tension in the body for relaxing or tightening the headgear when donned on a person's head.

In additional features, the drawstring assembly comprises first and second strings, first and second bands, and a cord lock. A first end of the first string is attached to the interior and exterior panels on a first side of the headgear and a first end of the second string is attached to the interior and exterior panels on a second side of the headgear, and the first and second strings are secured together by the cord lock at a location along the first and second strings near second ends of the first and second strings. The first end of the first string is attached to the interior and exterior panels on the first side by a first band, to which band the first end of the first string is stitched and to which band the interior and exterior panels are transversely stitched; and the first end of the second string is attached to the interior and exterior panels on the second side by a second band, to which band the first end of the second string is stitched and to which band the interior and exterior panels are stitched.

The interior and exterior panels are transversely stitched to the bands at rearward locations that are closer to the cord lock than to the grommet, and the interior and exterior panels are additionally transversely stitched together at forward locations on opposite sides of the grommet that are closer to the grommet than to the cord lock. The interior and exterior panels are longitudinally stitched together substantially along an entire longitudinal length of the headgear.

Preferably, the headgear further comprises foam padding or cushioning in the space located between the exterior fabric panel and the interior fabric panel and surrounding the grommet. A mesh material preferably covers the foam padding or cushioning, and the mesh material is also transversely stitched to interior and exterior panels at the forward locations.

In yet additional features of this aspect, the interior and exterior panels are transversely stitched together at rearward locations; the interior and exterior panels are additionally transversely stitched together at forward locations on opposite sides of the grommet; the rearward location of a first side of the headgear is closer to the other rearward location than to the forward location on the first side of the headgear; and the rearward location on a second side of the headgear is closer to the other rearward location than to the forward location on the second side of the headgear. The interior and exterior panels are longitudinally stitched together substantially along an entire longitudinal length of the headgear. Foam padding or cushioning is located in the space between the exterior fabric panel and the interior fabric panel and surrounding the grommet. A mesh material covers the foam padding or cushioning and preferably is transversely stitched to interior and exterior panels at the forward locations.

In another aspect, headgear comprises: (a) a fabric body comprising an interior fabric panel defining an inwardly facing interior surface and an exterior fabric panel defining an outwardly facing exterior surface, with opposite ends of the exterior fabric panel being located in a rear region of the headgear and opposite ends of the interior fabric panel overlapping to an extent and being located in a front region of the headgear, the interior and exterior panels being secured together such that the body surrounds a head-receiving area and is configured for donning on a person's head; and (b) a grommet attached to the body and defining an opening extending through the exterior fabric panel into a space located between the exterior fabric panel and the interior fabric panel. The overlapping ends of the interior fabric panel are open and are configured to accommodate the passing of a light apparatus into the space located between the exterior fabric panel and the interior fabric panel; and the grommet accommodates the passing of a portion of the light apparatus therethrough for frictional fit therewith such that the light apparatus is retained in place by the frictional fit with the grommet and light is projected by the light apparatus outwardly from the grommet when the light apparatus is turned on. Additionally, the headgear comprises means for adjusting the tension in the headgear for tightening or loosening the headband.

In another aspect, a method of making headgear comprises the steps of: (a) forming a body comprising an interior fabric panel defining an inwardly facing interior surface and an exterior fabric panel defining an outwardly facing exterior surface, with opposite ends of the exterior fabric panel being located in a rear region of the headgear and opposite ends of the interior fabric panel overlapping to an extent and forming a passage into a space located between the exterior fabric panel and the interior fabric panel at a front region of the headgear, the interior and exterior panels being secured together such that the body surrounds a head-receiving area and is configured for donning on a person's head; (b) attaching a grommet to the body which grommet defines an opening extending through the exterior fabric panel into the space located between the exterior fabric panel and the interior fabric panel; (c) passing a light apparatus through the passage defined between the overlapping ends of the interior fabric panel; and (d) passing of a portion of the light apparatus through the opening in the grommet such that the light apparatus is retained in place by a frictional fit with the grommet and light is projected by the light apparatus outwardly from the grommet when the light apparatus is turned on.

In another aspect of the invention, headgear comprises foam cushioning or padding in a front region of the headgear in order to avoid a unicorn effect that results from tension in the headgear when donned on one's head. The foam cushioning or padding is located within a space defined by exterior and interior panels, and it surrounds a grommet that is configured to receive a removable light apparatus.

In another aspect, a drawstring assembly is provided that is attached to the exterior and interior panels for adjustable tensioning of the front region of the headgear. The adjustable tensioning enables the headgear to be used with a range of various sizes of heads.

The headgear of the foregoing aspects preferably comprises a headband.

Yet additional features are set forth in the incorporated disclosures.

In addition to the aforementioned aspects and features of the invention, it should be noted that the invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWING

One or more preferred embodiments of the invention now will be described in detail with reference to the accompanying drawing.

FIG. 1 is a schematic illustration of a preferred embodiment of headgear in accordance with one or more aspects and features of the invention.

DETAILED DESCRIPTION

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once during performance of the claimed method.

Furthermore, it is important to note that, as used herein, "comprising" is open-ended insofar as that which follows such term is not exclusive. Additionally, "a" and "an" each generally denotes "at least one" but does not exclude a plurality unless the contextual use dictates otherwise. Thus, reference to "a picnic basket having an apple" is the same as "a picnic basket comprising an apple" and "a picnic basket including an apple", each of which identically describes "a picnic basket having at least one apple" as well as "a picnic basket having apples"; the picnic basket further may contain one or more other items beside an apple. In contrast, reference to "a picnic basket having a single apple" describes "a picnic basket having only one apple"; the picnic basket further may contain one or more other items beside an apple. In contrast, "a picnic basket consisting of an apple" has only a single item contained therein, i.e., one apple; the picnic basket contains no other item.

When used herein to join a list of items, "or" denotes "at least one of the items" but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers"; the picnic basket further may contain one or more other items beside cheese and crackers.

When used herein to join a list of items, "and" denotes "all of the items of the list". Thus, reference to "a picnic basket having cheese and crackers" describes "a picnic basket having cheese, wherein the picnic basket further has crackers", as well as describes "a picnic basket having crackers, wherein the picnic basket further has cheese"; the picnic basket further may contain one or more other items beside cheese and crackers.

The phrase "at least one" followed by a list of items joined by "and" denotes an item of the list but does not require every item of the list. Thus, "at least one of an apple and an orange" encompasses the following mutually exclusive scenarios: there is an apple but no orange; there is an orange but no apple; and there is both an apple and an orange. In these scenarios if there is an apple, there may be more than one apple, and if there is an orange, there may be more than one orange. Moreover, the phrase "one or more" followed by a list of items joined by "and" is the equivalent of "at least one" followed by the list of items joined by "and".

Referring now to the drawings, one or more preferred embodiments of the invention are next described. The following description of one or more preferred embodiments is merely exemplary in nature and is in no way intended to limit the invention, its implementations, or uses.

FIG. 1 is a schematic illustration of a preferred embodiment of headgear in accordance with one or more aspects and features of the invention. As illustrated, the headgear 10 includes a body having an interior fabric panel 12 defining an inwardly facing interior surface and an exterior fabric panel 14 defining an outwardly facing exterior surface. Opposite ends of the exterior fabric panel 14 are located in a rear portion or region of the headgear, and opposite ends of the interior fabric panel 12 overlapping to an extent at 17 are located in a front portion or region of the headgear. The interior and exterior panels 12,14 are secured together such that the body surrounds a head-receiving area and is configured for donning on a person's head. A grommet 16 is attached to the body and defines an opening extending through the exterior fabric panel 14 into a space located between the exterior fabric panel 14 and the interior fabric panel 12. The overlapping ends of the interior fabric panel at 17 define a passage accommodating the passing of a light apparatus therethrough for frictional fit in the grommet 16.

The headgear 10 further comprises a drawstring assembly 18 configured to adjust tension in the body for relaxing or tightening the headgear when donned on a person's head. The drawstring assembly comprises first and second cords or strings 20,22; first and second bands 24,26, which may be elastic; and a cord lock 28.

A first end of the first string 20 is attached to the interior and exterior panels 12,14 on a first side of the headgear at location 21, and a first end of the second string 22 is attached to the interior and exterior panels 12,14 on a second side of the headgear at location 23. Preferably, the first end of the first string 20 is attached to the interior and exterior panels 12,14 on the first side by the first band 24, to which band 24 the first end of the first string 20 is stitched and to which band 24 the interior and exterior panels 12,14 are transversely stitched at location 21; and the first end of the second string 22 is attached to the interior and exterior panels 12,14 on the second side by the second band 26, to which band 26 the first end of the second string 22 is stitched and to which band 26 the interior and exterior panels 12,14 are stitched at location 23. The first and second strings 20,22 are secured together by the cord lock 28 at a location 29 on the first and second strings 20,22 near their opposite ends. The interior and exterior panels 12,14 are thereby transversely stitched to the bands 24,26. The locations 21,23 are rearward in that the locations are closer along the body to the cord lock 28 in the rear region than to the grommet 16 in the front region.

Similarly, the interior and exterior panels 12,14 are additionally transversely stitched together at forward locations 25,27 on opposite sides of the grommet 16, which are closer along the body to the grommet 16 than to the cord lock 28.

The headgear 10 further preferably comprises foam padding or cushioning 30 arranged within the space located between the interior fabric panel 12 and exterior fabric panel 14, and surrounding the grommet.

In use, the headgear 10 is donned onto one's head by slipping the body over and around one's head. The cords 20,22 are then pulled to tighten the headgear for securing the headgear onto one's head. Pulling the cords 20,22 tensions the bands 24,26 which, in turn, tensions the interior and exterior panels 12,14 at rearward locations where the panels are transversely stitched to the bands. The bands may be elastic or inelastic. Bands preferably are used to distribute the tension transversely across the width of the headgear, thereby avoiding tension being applied to the panels at a single point by a cord. The panels preferably are inelastic but may be elastic, and tensioning the panels by the bands results in tensioning of the front region of the headgear. The tensioning is maintained by locking the cords together using the cord lock 28. The drawstring assembly 18 thereby enables adjustment of the tension in the headgear for tightening—or loosening—the headgear when donned on a person's head. Because of the adjustable tensioning, the same headgear may be used with a range of head sizes.

In another aspect, a method of making the headgear comprises the steps of: forming a body comprising an interior fabric panel defining an inwardly facing interior surface and an exterior fabric panel defining an outwardly facing exterior surface, with opposite ends of the exterior fabric panel being located in a rear region of the headgear and opposite ends of the interior fabric panel overlapping to an extent and forming a passage into a space located between the exterior fabric panel and the interior fabric panel at a front region of the headgear, the interior and exterior panels being secured together such that the body surrounds a head-receiving area and is configured for donning on a person's head; attaching a grommet to the body which grommet defines an opening extending through the exterior fabric panel into the space located between the exterior fabric panel and the interior fabric panel; passing a light apparatus of the incorporated disclosures through the passage defined between the overlapping ends of the interior fabric panel; and passing of a portion of the light apparatus through the opening in the grommet such that the light apparatus is retained in place by a frictional fit with the grommet and light is projected by the light apparatus outwardly from the grommet when the light apparatus is turned on.

The headgear that is made preferably comprises a headband. Other embodiments may comprise a beanie or cap. In this regard, a tubular end may be sewn around or otherwise affixed to a top of the body.

A prototype headband 100 representing an embodiment in accordance with one or more aspects and features of the invention is shown in FIGS. 2-8 of the publication of the present application, namely, U.S. patent application publication US2023/0020635, which is incorporated herein by reference ("the '635 Publication").

Specifically, FIG. 2 of the '635 Publication is a front elevational view of the headband 100; FIG. 3 of the '635 Publication is a partial top view of the headband 100; FIG. 4 of the '635 Publication is an elevational view of the overlapping ends of the interior panel 112 of the headband 100; FIG. 5 of the '635 Publication is a close-up view in greater detail of a portion of the overlapping ends of the interior panel of the headband 100; FIG. 6 of the '635 Publication is a close-up view of the passage defined by the overlapping ends of the interior panel the headband 100 shown in FIG. 5; FIG. 7 of the '635 Publication is a view through the passage of FIG. 6 of the '635 Publication to the grommet 116, which view reveals a mesh material 132 that covers a foam cushioning or padding 130 surrounding the grommet 116 within the space between the exterior and interior panels; and FIG. 8 of the '635 Publication is a rear elevational view of the headband 100 showing the drawstring assembly 118.

The interior and exterior panels of the headband 100 preferably are transversely stitched together at rearward locations. The interior and exterior panels are additionally transversely stitched together at forward locations on opposite sides of the grommet 116. The rearward location of a first side of the headgear is closer to the other rearward location than to the forward location on the first side of the headgear; and the rearward location on a second side of the headgear is closer to the other rearward location than to the forward location on the second side of the headgear. The mesh material preferably covers the foam padding or cushioning, and the mesh material also is transversely stitched to interior and exterior panels at the forward locations. The foam padding or cushioning provides comfort to the front region of the headband especially when the headband is tensioned. The foam also avoids the appearance of a unicorn effect that otherwise may appear when the headband is tensioned in the front region on opposite sides of the grommet; the tension ends to flatten out the panels thereby emphasizing the thickness of the grommet and light apparatus when received in frictional fit therein.

Additionally, the interior and exterior panels preferably are longitudinally stitched together substantially along an entire longitudinal length of the headgear. This is perhaps best shown in FIG. 3 of the '635 Publication.

Based on the foregoing description, it will be readily understood by those persons skilled in the art that the invention has broad utility and application. Many embodiments and adaptations of the invention other than those specifically described herein, as well as many variations, modifications, and equivalent arrangements, will be apparent from or reasonably suggested by the invention and the foregoing descriptions thereof, without departing from the substance or scope of the invention.

Accordingly, while the invention has been described herein in detail in relation to one or more preferred embodiments, it is to be understood that this disclosure is only illustrative and exemplary of the invention and is made merely for the purpose of providing a full and enabling disclosure of the invention. The foregoing disclosure is not intended to be construed to limit the invention or otherwise exclude any such other embodiments, adaptations, variations, modifications or equivalent arrangements, the invention being limited only by the claims appended hereto and the equivalents thereof.

What is claimed is:

1. Headgear, comprising:

(a) a fabric body comprising an interior fabric panel defining an inwardly facing interior surface and an exterior fabric panel defining an outwardly facing exterior surface, with opposite ends of the exterior fabric panel being located in a rear region of the headgear and opposite ends of the interior fabric panel overlapping to an extent and being located in a front region of the headgear, the interior and exterior panels being secured together such that the body surrounds an interior area for donning of the headgear onto a person's head;

(b) a grommet attached to the body and defining an opening extending through the exterior fabric panel into a space located between the exterior fabric panel and the interior fabric panel; and (c) a drawstring assembly comprising first and seconds strings, first and second bands, and a cord lock, and being configured to adjust tension in the body for relaxing or tightening the headgear when donned on a person's head;

(d) wherein a first end of the first string is attached to the interior and exterior panels on a first side of the headgear and a first end of the second string is attached to the interior and exterior panels on a second side of the headgear, and wherein the first and second strings are secured together by the cord lock at a location along the first and second strings near second ends of the first and second strings;

(e) wherein the overlapping ends of the interior fabric panel are open and are configured to accommodate a passing of a light apparatus into the space located between the exterior fabric panel and the interior fabric panel; and (f) wherein the grommet accommodates the passing of a portion of the light apparatus therethrough for frictional fit therewith such that the light apparatus is retained in place by the frictional fit with the grommet and light is projected by the light apparatus outwardly from the grommet when the light apparatus is on.

2. The headgear of claim 1, wherein the first end of the first string is attached to the interior and exterior panels on the first side by a first band, to which band the first end of the first string is stitched and to which band the interior and exterior panels are transversely stitched; and wherein the first end of the second string is attached to the interior and exterior panels on the second side by a second band, to which band the first end of the second string is stitched and to which band the interior and exterior panels are stitched.

3. The headgear of claim 2, wherein the interior and exterior panels are transversely stitched to the bands at rearward locations that are closer to the cord lock than to the grommet, and wherein the interior and exterior panels are additionally transversely stitched together at forward locations on opposite sides of the grommet that are closer to the grommet than to the cord lock.

4. The headgear of claim 3, wherein the interior and exterior panels are longitudinally stitched together substantially along an entire longitudinal length of the headgear.

5. The headgear of claim 3, further comprising foam padding or cushioning in the space located between the exterior fabric panel and the interior fabric panel and surrounding the grommet.

6. The headgear of claim 5, wherein a mesh material covers the foam padding or cushioning.

7. The headgear of claim 6, wherein the mesh material is also transversely stitched to interior and exterior panels at the forward locations.

8. Headgear, comprising:

(a) a fabric body comprising an interior fabric panel defining an inwardly facing interior surface and an exterior fabric panel defining an outwardly facing exterior surface, with opposite ends of the exterior fabric panel being located in a rear region of the headgear and opposite ends of the interior fabric panel overlapping to an extent and being located in a front region of the headgear, the interior and exterior panels being secured together such that the body surrounds an interior area for donning of the headgear onto a person's head; and (b) a grommet attached to the body and defining an opening extending through the exterior fabric panel into a space located between the exterior fabric panel and the interior fabric panel;

(c) wherein the interior and exterior panels are transversely stitched together at rearward locations, the interior and exterior panels are additionally transversely stitched together at forward locations on opposite sides of the grommet, the rearward location of a first side of the headgear is closer to the other rearward location than to the forward location on the first side of the headgear, and the rearward location on a second side of the headgear is closer to the other rearward location than to the forward location on the second side of the headgear;

(d) wherein the overlapping ends of the interior fabric panel are open and are configured to accommodate a passing of a light apparatus into the space located between the exterior fabric panel and the interior fabric panel; and (e) wherein the grommet accommodates the passing of a portion of the light apparatus therethrough for frictional fit therewith such that the light apparatus is retained in place by the frictional fit with the grommet and light is projected by the light apparatus outwardly from the grommet when the light apparatus is turned on.

9. The headgear of claim 8, wherein the interior and exterior panels are longitudinally stitched together substantially along an entire longitudinal length of the headgear.

10. The headgear of claim 8, further comprising foam padding or cushioning in the space located between the exterior fabric panel and the interior fabric panel and surrounding the grommet.

11. The headgear of claim 10, wherein a mesh material covers the foam padding or cushioning.

12. The headgear of claim 11, wherein the mesh material is also transversely stitched to interior and exterior panels at the forward locations.

13. A headband, comprising:

(a) a fabric body comprising an interior fabric panel defining an inwardly facing interior surface and an exterior fabric panel defining an outwardly facing exterior surface, with opposite ends of the exterior fabric panel being located in a rear region of the headgear and opposite ends of the interior fabric panel overlapping to an extent and being located in a front region of the headgear, the interior and exterior panels being secured together such that the body surrounds a head-receiving area and is configured for donning on a person's head;

(b) a grommet attached to the body and defining an opening extending through the exterior fabric panel into a space located between the exterior fabric panel and the interior fabric panel; and (c) foam padding or cushioning located in the space between the interior and exterior panels in the front region of the headgear and surrounding the grommet;

(d) wherein the overlapping ends of the interior fabric panel are open and are configured to accommodate a passing of a light apparatus into the space located between the exterior fabric panel and the interior fabric panel; and (e) wherein the grommet accommodates the passing of a portion of the light apparatus therethrough for frictional fit therewith such that the light apparatus is retained in place by the frictional fit with the grommet and light is projected by the light apparatus outwardly from the grommet when the light apparatus is turned on; and further comprising means for adjusting the tension in the headband for tightening or loosening the headband when donned on a person's head.

* * * * *